Figures 1, 5:
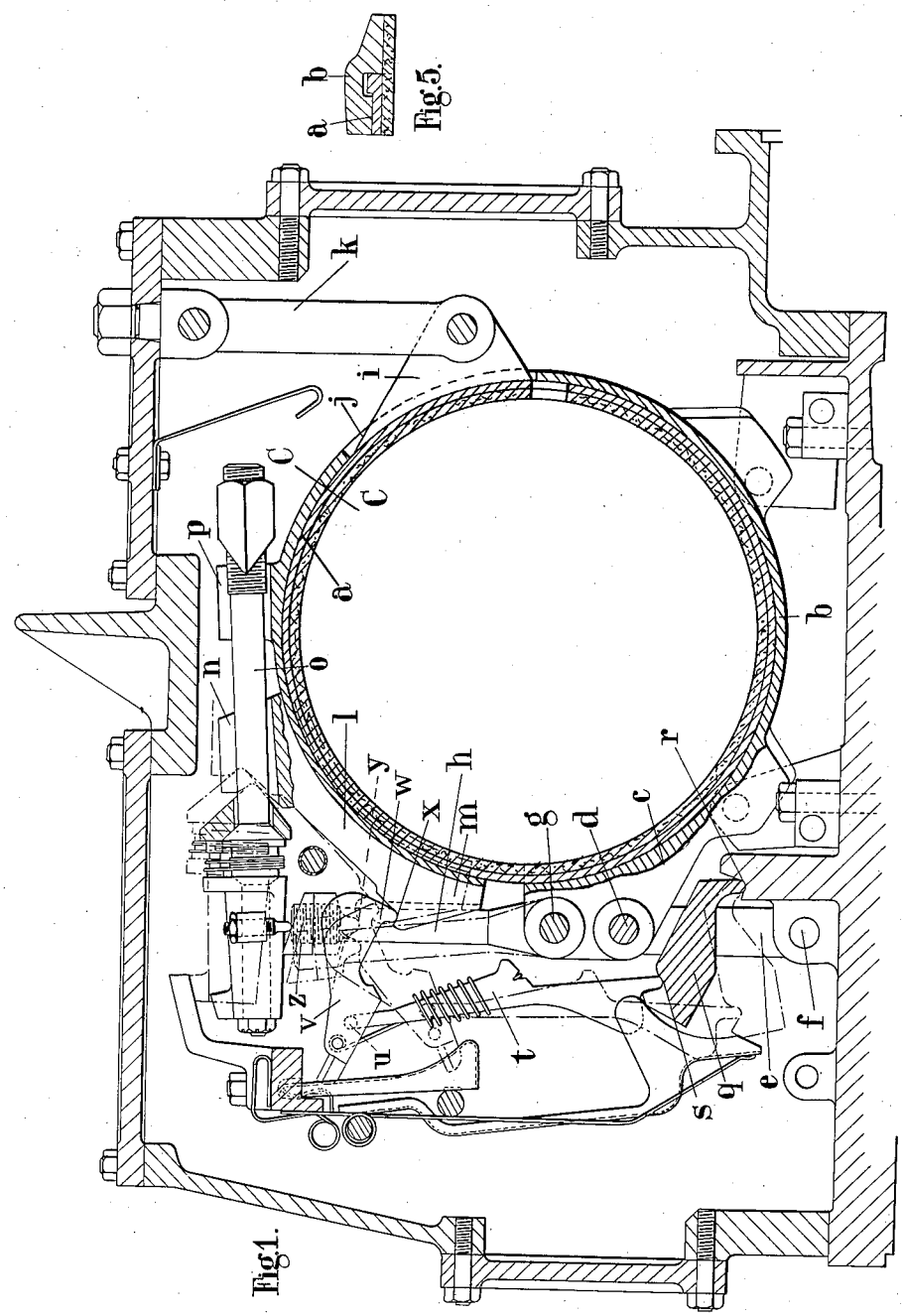

June 27, 1933.  W. G. WILSON  1,915,706
FLEXIBLE BAND BRAKE
Filed Feb. 10, 1930  3 Sheets-Sheet 1

W. G. Wilson
INVENTOR

By: Marks & Clerk
Attys.

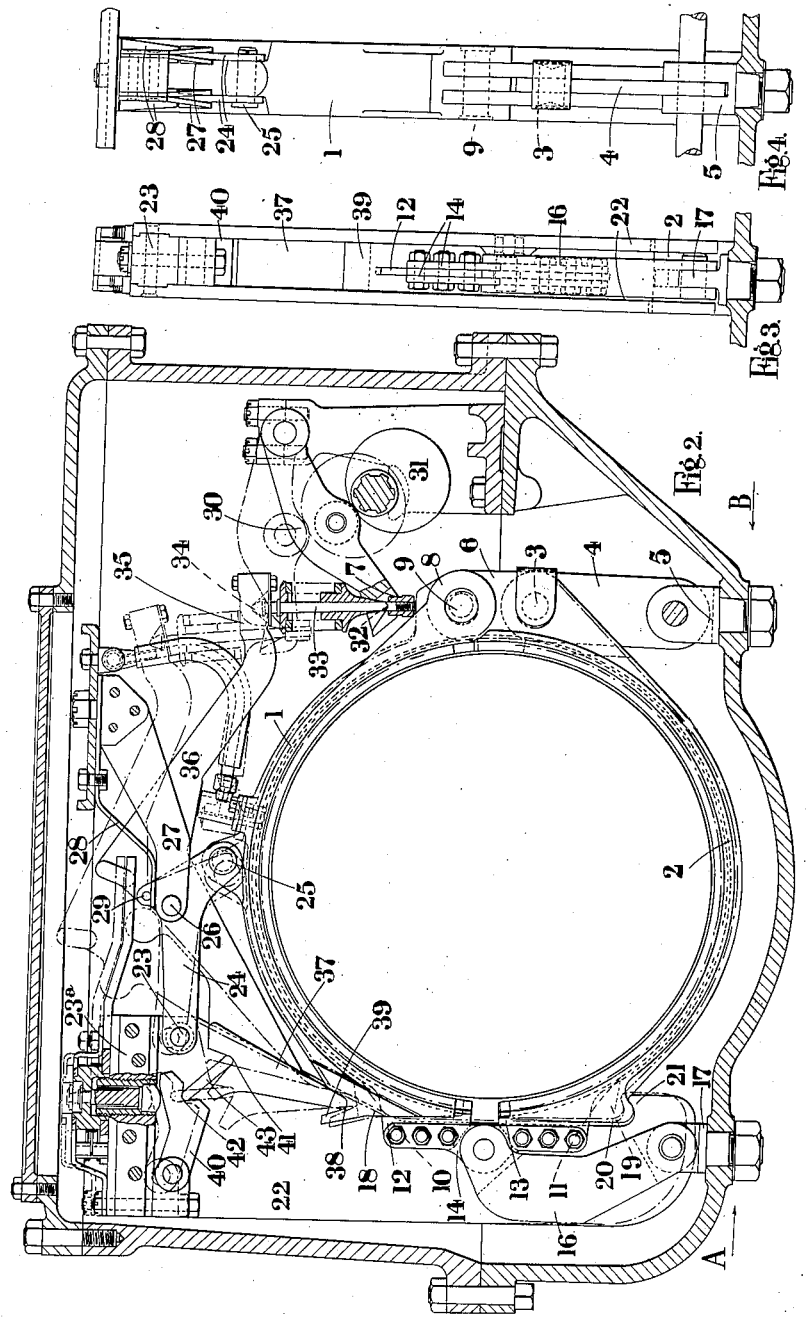

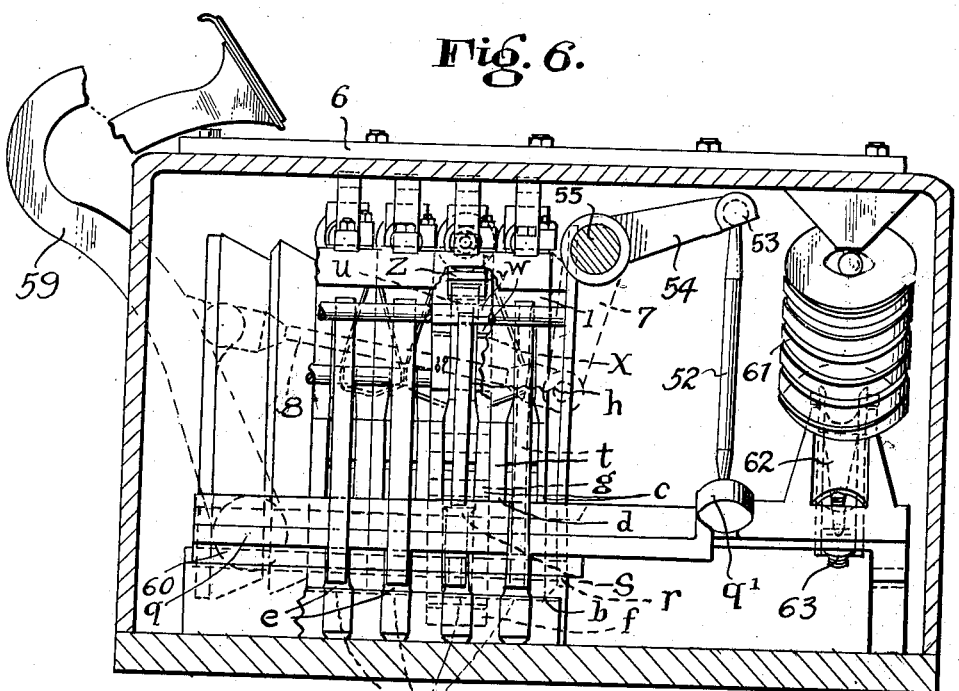

Patented June 27, 1933

1,915,706

UNITED STATES PATENT OFFICE

WALTER GORDON WILSON, OF WESTMINSTER, LONDON, ENGLAND

FLEXIBLE BAND BRAKE

Application filed February 10, 1930, Serial No. 427,308, and in Great Britain February 12, 1929.

This invention relates to braking mechanism for self propelled vehicles, and more particularly to flexible band brake mechanism of the kind described in the specification of my U. S. Patent No. 1,714,833, dated April 6th, 1923.

Such a flexible brake, which is suitable amongst other uses, for the reaction drums of an epicyclic driving gear, comprises a primary brake band, within which is arranged a pair of secondary brake bands, side by side and one of which may be integral with the primary band.

The commencing end of one band is displaced 180° from the other. Two points of anchorage for such secondary bands are provided for such a braking system on relatively opposite sides of the diameter of the rotating element whose speed is to be controlled. The anchorage for the primary band and thus of one of the secondary bands, comprises a hook formed on the end of the band. Such hook is connected by a link to the fixed frame to constitute an anchorage and the free end of the primary band is pivoted to a toggle lever system, and the braking effort is applied by tightening the free end of the primary element over the secondary band or bands around the drum through the toggle action. The anchorage for the other secondary band comprises a lug fixed, on the end thereof and extending radially through a slot in the primary band where it is connected by a link to the fixed frame.

Such a braking system is known as a lapping brake by means of the fact that the braking action is obtained by winding or a lapping both the primary and secondary bands on the brake drum, in the direction of rotation of the latter.

A braking system as above described is efficient for one direction of rotation, but when it is applied to an epicyclic driving system, comprising a number of groups for speed ahead and reverse, the reaction member of the latter group will rotate in a direction opposite to that of the others. In order therefore, to apply the above braking system to such reverse gear it would be necessary to arrange the actuation gear and the bands for such reversing element the other way round to suit its direction of rotation.

Such an arrangement would necessitate having the controls for the reverse speed groups on the opposite side of the reaction drums to those of the forward speed groups, and for this reason, would be, both from a practical and commercial point of view, totally unsatisfactory.

One object of the present invention is to so adapt a braking system of the kind described in the specification of the above patent, that it will act as a lapping brake, for the reverse or counter-clockwise direction of the reaction drum, and at the same time will permit of its control gear being positioned on the same side of the brake drum as those of the forward speed groups.

A further object of the invention is such an adaptation of a braking system as embodied in the above patent, that an effective lap braking action may be produced whether the brake drum is rotating in one direction or the other.

The invention consists in a flexible band brake system adapted to control a number of rotary elements according to which, whether the rotary elements are rotating in one direction or the other, or some in one direction and some in the other, a lapping brake action is obtained for each element and the several controls are all arranged on and operated from one side.

The invention will now be described with reference to the accompanying drawings in which:

Figure 1 is a general side elevation of a lapping brake for counter-clockwise rotation of the brake drum, constructed according to the invention and shown in the "on" position, with the "off" position shown in dotted lines.

Figure 2 a general side elevation of a lapping brake for both clockwise and counter-clockwise rotation constructed according to the invention and shown in the "off" position with the "on" position in dotted lines.

Figure 3 an end elevation, in the direction of arrows A—A.

Figure 4 an end elevation in the opposite direction.

Figure 5 a cross section taken on the line C—C of Figure 1, showing the preferred assembly of the primary and secondary brake bands.

Figures 6 and 7 are sectional views of the brake operating mechanism.

In carrying one example of the invention into effect so as to attain the first object hereinbefore referred to, and in a system according to which the actuating mechanism and the brake bands in the various groups are each arranged to provide a lapping brake for clockwise rotation of the drums in the manner described in my Patent No. 1,714,833, and a lapping brake for the anti-clockwise rotation of the reversing drum having its actuating gear on the same side of said reversing drum, as those of the clockwise rotating drums, the brake element for the reversing drum (see Figures 1 and 5) comprises a brake band $a$ which extends around the brake drum and forms a secondary brake element. Superimposed upon the brake band $a$ is a band brake $b$ which forms the primary brake element and is so arranged as to contact across half its width with the brake drum thus constituting a direct brake. It is to be understood that although in the preferred arrangement of the brake element, only one secondary brake band is used, two such brake bands disposed side by side could be included, if necessary. Each band has its own brake lining of asbestos or other similar material, and is arranged so that its two ends are relatively near to one another, the respective ends of one band being displaced substantially 180° to those of the other band, so as to be on opposite sides of the centre of the drum.

One end of the primary brake band $b$ is formed with a block $c$ pivotally connected at $d$ to a link $e$, the other end of which is firmly attached at $f$ to the fixed casing, thus constituting the anchorage for the said band, the other end of which is left free. To the block $c$ there is also pivoted at $g$ a pull-rod $h$ which forms the reaction member of a toggle lever system to be hereinafter described. The secondary brake band $a$ is also anchored at one end to the fixed casing by means of a lug $i$ which extends radially through a slot $j$ in the band $b$, and is pivoted to a link $k$ which in turn is pivotally connected to the casing, the other end of the band being also left free.

The free or actuated end of the primary brake band $b$ is provided with a separate segment $l$, hooked or otherwise formed at one end $m$ to constitute a point of application of the brake, such segment lying upon the back of the plain end or tail of the primary brake band.

The other end $n$ of the segment is forked and a tangentially arranged adjustment rod $o$ passes between the jaw of the fork, as well as through a lug $p$ formed on the primary brake band proper, such rod being automatically adjusted from time to time to compensate for wear of the brake element. The means whereby any wear on the brake bands is automatically taken up, does not form part of the present invention and will accordingly not be further described.

The toggle lever system comprises a buss bar $q$ (Figs. 6 and 7) which is operated by means of a foot pedal 59 and is fulcrummed about the knife edge $r$ on the fixed casing. Supported on the buss bar, by means of a knife edge $s$ is a strut $t$ which in turn has pivotally mounted at its upper end by means of a knife edge $u$, a thrust pad $v$ which is extended to form a hooked end $w$ having a knife edge connection $x$ with a similarly hooked end $m$ of the segment $l$. The hooked end $w$ of the thrust pad $v$ is also pivotally connected by means of a knife edge $y$ to a nut $z$ screwed onto the upper end of the pull rod $h$.

The means for turning the buss-bar $q$ are clearly shown in Figures 6 and 7, according to which an arm $q'$ extending from the buss-bar has pivotally mounted thereon a strut 52 which is connected at its upper end, by means of a ball joint 53, to a lever arm 54 which is fixed to one end of a rod 55 rotatably mounted in the gear box casing 56. The other end of the rod 55 extends through the gear box casing 56 and has fixed thereto another lever arm 57 which is connected by a link-rod 58 to the pedal 59 pivoted at 60 to a fixed part of a frame (not shown).

When the pedal lever 59 is pushed down, it swings about its pivot 60 and exerts a pull on the link rod 58 which in turn rotates the rod 55 in a clockwise direction (Fig. 6) through the medium of lever arm 57, this movement of the rod 55 being imparted to the other lever arm 54 pivotally connected to the strut 52. The clockwise movement of the lever arm 54 Fig. 6, imparts a downward movement to the strut 52 which latter, through its pivotal connection with the bracket arm $q'$, pushes the buss-bar $q$ down into the position shown in dotted lines in Figure 1.

Upon releasing the pressure on the pedal lever 59 the buss-bar $q$ returns to its upper position under the action of the spring 61 upon a finger 62 acting on a member 63 pivotally supported by the buss bar on the side of its fulcrum opposite to that on which the arm $q'$ is arranged as described in the specification of my prior U. S. Patent application No. 403,100, and thus causes the strut 52 to move upwardly and impart a counter-clockwise movement to the lever arm 54, rod 55 and lever arm 57, thus returning the pedal lever to its upper position.

As will be seen from Figure 6, the buss bar $q$ extends along the full length of the gear box so as to be able to actuate the toggle mechanism of any of the gear groups 64.

When the brake is in the "off" position the pedal is pressed down, with the toggle lever system in the position shown in dotted lines (Fig. 1). In this position the buss bar $q$ has been swung downwardly about its fulcrum $r$, bringing the strut $t$ down with it. This downward movement of the strut $t$ causes a turning movement to be imparted to the thrust pad $v$ about its fulcrum $u$, in a counter-clockwise direction, and at the same time by reason of the second fulcrum $y$ causes the pull rod $h$ to be swung away from the brake element about its pivot $g$ into the position shown in dotted lines. In this way the thrust pad $v$ is lifted away from the hooked end $m$ of the segment $l$, and the pressure exerted by the former on the latter, completely relieved. Engagement between the hooked end of the thrust pad $v$ and the segment is still maintained however, since the brake element by reason of its own resiliency springs outwards away from the brake drum as soon as the pressure is relieved, and takes up, together with its automatic adjusting mechanism, the position shown in dotted lines.

In order to apply the brake, the foot pedal is released and the buss bar $q$ allowed to rise into the upper position about its fulcrum $r$ under the action of spring 61. This upward movement of the buss bar causes the strut $t$ to be also pushed upwards, which latter in turn imparts a turning movement to the thrust pad $v$, in a clockwise direction, by reason of the relative position of the two fulcrums $u$ and $y$. At the same time by reason of the relative position of the fulcrum $y$ the pull rod $h$ is swung over towards the brake element as a result of which the segment $l$ is not only moved circumferentially towards the anchored end of the primary band in a counter-clockwise direction, but is also radially applied thus causing its movement to be imparted to both the primary and the secondary brake bands which are consequently tightened on the brake drum in a counter-clockwise direction. In this way owing to the anti-clockwise rotation of the drum, an effective lapping brake is thereby obtained.

Further such construction of brake element permits of the actuating mechanism for both the forward and reverse speed groups being all positioned on the same side of their respective reaction drums.

It will be understood that although the brake element according to the invention has been described for use in connection with reverse speed groups, it could if necessary be equally well adapted for forward speed groups, in which case the ordinary lapping brake as described in my patent hereinbefore referred to, would be used for the reverse speed groups.

Referring now to a second embodiment of my invention as illustrated in Figures 2, 3 and 4 and in which a braking system as described in my patent, already referred to, is adapted to provide an effective lap braking action for either direction of rotation of the brake drum, the primary brake band is made in two halves 1 and 2 respectively, the lower half 2 being pivotally connected at 3 to one end of a link 4 the other end of which is firmly attached to the casing by means of an eye-bolt 5. This anchored end of the primary band is extended to form a lug 6 which is forked at its upper end 7 and adapted to receive the correspondingly forked end 8 of the upper half of the primary brake band, the two halves being thus pivotally or hingedly connected together by means of a pin 9. In this way the two halves forming the primary brake band are provided with a common anchorage, which is substantially at the centre part of the said band.

In a similar manner the secondary brake band is formed in two halves 10 and 11 each connected at their respective ends by means of lugs 12 and 13 to a common yoke 14 pivotally mounted at 15 to one end of a link 16 which in turn is fixed to the casing by means of an eye-bolt 17.

In this way the two halves of the secondary brake band have also a common anchorage disposed at or near the centre part of the said band, the anchorage for the secondary brake band being disposed on the opposite side of the brake drum to that of the primary brake band and displaced substantially at an angle of 180° thereto.

The free ends of the primary band brake are provided with slots 18 and 19 through which pass the lugs 12 and 13 forming the anchored ends of the two halves of the secondary brake band, the free ends of the latter being disposed on the same side of the brake drum as the anchorage for the two halves of the primary brake band.

The free end of the lower half 2 of the primary band is formed with a lug 20 which is engaged by the hooked end 21 of a link 22 extending upwardly to the top of the casing where it is connected at 23 to one arm of a two-armed lever 24, the other arm of which is connected at 25 to the primary brake band. The two armed lever 24 is connected at the non-moving point 26 to an arm 27 fixed to the casing and is further supported by means of a spring 28 attached to the casing and adapted to engage with the underside of a pin 29 provided in the lever 24.

Two such link plates 22 are provided for each brake drum which plates are positioned one behind the other on either side of the drum as viewed in Figure 3 and both engage the free end 20 of the lower half of the primary brake band. The two link plates 22 are connected together at their upper ends by means of an automatic brake adjustment mechanism 23ª which, however, does not form part of the present invention.

The toggle lever mechanism comprises a buss bar 30 which is operated by a cam 31 and pivotally supports at one end by means of a knife edge 32 a strut 33 which in turn supports at its upper end, by means of the knife edge 34 one end 35 of a thrust pad 36 the other end 37 of which is tapered and engages with a knife edge connection 38 with the free end 39 of the upper half of the primary band. Finally, between the tapered end 37 of the thrust pad and an arm 40 fixed to the upper part of the link plate 22 there is mounted on knife edges 41 and 42 a strut 43.

In the "off" position of the brake element the toggle mechanism is in the position shown in full lines, with the buss bar down, and no pressure is being exerted on the brake bands which latter have sprung outwards away from the brake drum under the action of their own resiliency.

In order to put the brake "on" the cam 31 is rotated so as to raise the buss bar 30 into its upper position, which movement causes the strut 33 to be pushed upwards, the latter imparting its upward movement to the end 35 of the thrust pad 36. This upward movement of one end of the thrust pad causes the latter to be thrown over into the position shown in dotted lines, which movement forces the strut 43 to pivot about its two fulcra 41 and 42 until it assumes an almost vertical position. In this way the strut 43 is adapted to exert an upward force upon the arm 40 as well as an equal downward force upon the tapered end 37 of the thrust pad. The thrust pad in turn exerts a pressure both in a radial and circumferential direction on the free end 39 of the upper half 1 of the primary band thus causing the latter to be tightened onto the brake drum against its anchorage 9 and to slide in a counter-clockwise direction over the upper half of the secondary brake band 10, this relative movement between the two bands being allowed for by the slot 18.

At the same time the equal upward force imparted by the strut 43 to the arm 40 is transmitted to the link plates 22 which are consequently raised so that their hooked ends 21 exert a pressure on the free end 20 of the lower half 2 of the primary brake band also in a radial and circumferential direction. In this way the upward movement of the link plates 22 causes the lower half 2 of the primary brake band to be tightened onto the brake drum against its anchorage 3 in a similar manner to that of the upper half of said band, with this difference, that the lower half of the primary brake band slides over the lower half of the secondary brake band in a clockwise direction, a slot 19 being provided in the free end of the primary brake band for this purpose.

The pressure exerted by the upper and lower halves of the primary brake band is transmitted to their respective halves of the secondary brake band, so that for clockwise rotation of the reaction drum the braking effort is transmitted through the lower half of the primary brake band and the upper half of the secondary brake band, whilst for counter-clockwise rotation of the brake drum the braking effort is obtained through the upper half of the primary brake band and the lower half of the secondary brake band.

In this way, by the symmetrical arrangement of the bands, the braking effort is perfectly balanced, and a lapping brake provided for either direction of rotation of the drum.

Whilst the brake elements forming the subject matter of this invention have been more particularly described for use in connection with the reaction drums of an epicyclic driving gear, it is to be understood that such brake elements could be equally well applied to any other mechanism, the speed of which has to be controlled.

Also the toggle lever systems could if necessary be modified in respect of certain details to suit the various applications of the brake elements without departing from the scope of the invention.

Having now described my invention, what I claim as new and desire to secure by Letters Patent is:—

1. A flexible brake system comprising a number of rotary members, some of which rotate in a clockwise direction whilst the remainder rotate in a counter-clockwise direction, a group of braking elements for each rotary member, each group comprising a primary flexible band disposed around said member and a secondary flexible band arranged between said member and said primary band, means for anchoring said flexible bands, the anchoring means for each primary band being disposed diametrically opposite to the anchoring means for the associated secondary band, and mechanism for subjecting the primary bands of the oppositely rotating members to upwardly and downwardly directed pressure respectively in order to contract said primary bands and thereby draw said secondary bands into engagement with said members.

2. In a flexible brake system according to claim 1, means for controlling the pressure imparting mechanism associated with each primary band from the same side of the rotary members.

3. A flexible brake system according to claim 1, in which the pressure imparting mechanism associated with each primary band has the form of toggle lever mechanism associated with controlling means adapted to be manipulated from one side only of the rotary members.

4. A flexible brake system according to claim 1, in which a free end of each primary band is provided with a segment having a hooked end, and the pressure imparting mechanism associated with each such band comprises a buss bar movable about a fixed fulcrum, a strut pivotally supported by said buss bar, a thrust pad pivotally mounted at one end on the upper extremity of said strut, a pull rod pivotally connected to the other end of said thrust pad, which end of the latter is extended to form a hook engaging the hooked end of said segment, and means for actuating said buss bar so as to raise and lower said strut for the purpose described.

5. A flexible brake system comprising a number of rotary members, a group of braking elements for each rotary member, each group comprising a primary flexible band disposed around said member and a secondary flexible band arranged between said member and said primary band, which primary and secondary bands are each constructed in two parts, means for anchoring the parts of the flexible bands, the anchoring means for the parts of the primary band being disposed diametrically opposite to the anchoring means for the parts of the associated secondary band, and mechanism for simultaneously subjecting the free ends of each pair of parts constituting a said primary band to upwardly and downwardly directed pressure respectively for the purpose described.

6. A flexible brake system according to claim 5, in which the pressure imparting mechanism associated with each primary band comprises a buss bar movable about a fixed fulcrum, a strut pivotally supported by said buss bar, a thrust pad pivotally mounted at one end on the upper extremity of said strut and operatively associated at the other end with both the free ends of said primary band, and cam mechanism for actuating said buss bar.

7. A flexible brake system according to claim 5, in which the pressure imparting mechanism associated with each primary band comprises in combination a buss bar movable about a fixed fulcrum, a strut pivotally supported by said buss bar, a thrust pad pivotally mounted at one end on the upper extremity of said strut and operatively associated at the other end with both the free ends of said primary band, a secondary strut pivotally associated at one end with the free end of the half of said primary band, a fixed arm pivotally engaging the other end of said secondary strut, and cam mechanism for actuating said buss bar.

8. A flexible brake system according to claim 5, in which the pressure imparting mechanism associated with each primary band comprises in combination a buss bar movable about a fixed fulcrum, a strut pivotally supported by said buss bar, a thrust pad pivotally mounted at one end on the upper extremity of said strut and operatively associated at the other end with both the free ends of said primary band, a secondary strut pivotally associated at one end with the free end of one half of said primary band, a fixed arm pivotally engaging the other end of said secondary strut, pivotal link plates carrying said arm at one end and being hooked at the other end so as to engage the free end of the other half of said primary band, and cam mechanism for actuating said buss bar.

9. In a flexible brake system according to claim 5, slots formed in the free ends of the respective parts of the primary bands so as to permit their relative movement in relation to the anchored ends of the secondary bands.

In testimony whereof I have signed my name to this specification.

WALTER GORDON WILSON.